(12) United States Patent
Grayson et al.

(10) Patent No.: US 8,736,959 B2
(45) Date of Patent: May 27, 2014

(54) OMNIDIRECTIONAL REFLECTOR

(75) Inventors: Benjamin Alan Grayson, Ann Arbor, MI (US); Debasish Banerjee, Ann Arbor, MI (US); Minjuan Zhang, Ann Arbor, MI (US); Masahiko Ishii, Okazaki (JP)

(73) Assignees: Toyota Motor Engineering & Manufacturing North America, Inc., Erlanger, KY (US); Toyota Motor Corporation, Toyota-Shi (JP)

( * ) Notice: Subject to any disclaimer, the term of this patent is extended or adjusted under 35 U.S.C. 154(b) by 325 days.

(21) Appl. No.: 12/793,772

(22) Filed: Jun. 4, 2010

(65) Prior Publication Data

US 2011/0299154 A1 Dec. 8, 2011
US 2014/0055848 A9 Feb. 27, 2014

Related U.S. Application Data

(63) Continuation-in-part of application No. 12/388,395, filed on Feb. 18, 2009, which is a continuation-in-part of application No. 11/837,529, filed on Aug. 12, 2007, now Pat. No. 7,903,339.

(51) Int. Cl.
*G02B 1/10* (2006.01)

(52) U.S. Cl.
USPC ............................ 359/584; 359/586; 359/588

(58) Field of Classification Search
USPC ............. 359/584, 485.02, 586, 588; 427/466; 428/212
See application file for complete search history.

(56) References Cited

U.S. PATENT DOCUMENTS

| | | | | |
|---|---|---|---|---|
| 5,768,026 A * | 6/1998 | Kiyomoto et al. | ............ | 359/634 |
| 6,249,378 B1 * | 6/2001 | Shimamura et al. | ...... | 359/485.02 |
| 6,331,914 B1 * | 12/2001 | Wood et al. | .................... | 359/584 |
| 6,451,414 B1 * | 9/2002 | Wheatley et al. | ............. | 428/212 |
| 6,913,793 B2 * | 7/2005 | Jiang et al. | ..................... | 427/466 |
| 7,052,762 B2 * | 5/2006 | Hebrink et al. | ............... | 428/212 |
| 7,064,897 B2 * | 6/2006 | Hebrink et al. | .......... | 359/485.03 |
| 2009/0153953 A1 | 6/2009 | Banerjee | | |
| 2010/0209593 A1 | 8/2010 | Banerjee et al. | | |

OTHER PUBLICATIONS

Optical Coating Design Algorithm Based on the Equivalent Layers Theory; Alexander V. Tikhonravov et al; Applied Optics; vol. 45, No. 7; Mar. 2006.

* cited by examiner

*Primary Examiner* — Audrey Y Chang
(74) *Attorney, Agent, or Firm* — Gifford, Krass, Sprinkle, Anderson & Citkowski, P.C.

(57) ABSTRACT

An omnidirectional reflector that reflects a band of electromagnetic radiation of less than 100 nanometers when viewed from angles between 0 and 45 degrees is provided. The omnidirectional reflector includes a multilayer stack having a plurality of layers of high index of refraction material and a plurality of layers of low index of refraction material. In addition, the plurality of high index of refraction material layers and low index of refraction material layers are alternately stacked on top of or across each other and provide a non-periodic layered structure.

18 Claims, 7 Drawing Sheets

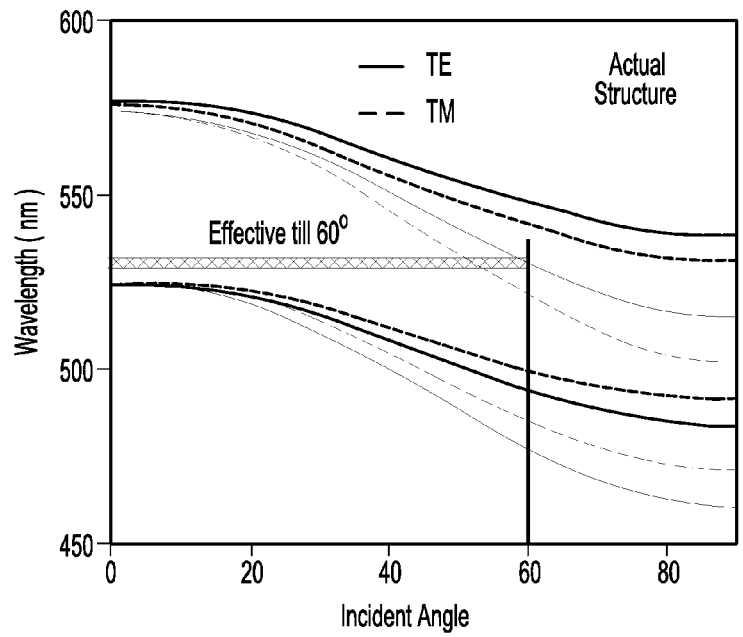
*Fig-1c*
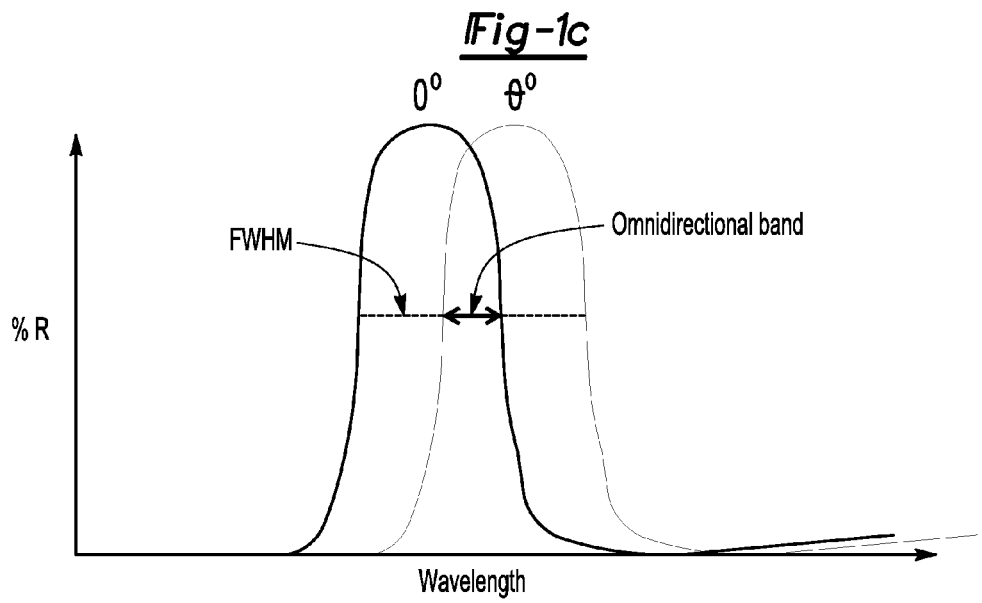
*Fig-1d*
*Fig-2*

# OMNIDIRECTIONAL REFLECTOR

CROSS-REFERENCE TO RELATED APPLICATIONS

This application is a continuation-in-part of U.S. patent application Ser. No. 12/388,395, filed Feb. 18, 2009, which is a CIP of U.S. patent application Ser. No. 11/837,529 filed Aug. 12, 2007 (now U.S. Pat. No. 7,903,339 issued Mar. 8, 2011).

FIELD OF THE INVENTION

The present invention relates to an omnidirectional reflector, and in particular, to an omnidirectional reflector that is a structural color and is made from materials having relatively low indices of refraction.

BACKGROUND OF THE INVENTION

Based on theoretical calculations of a one-dimensional (1-D) photonic crystal, design criteria for omnidirectional (angle independent) structural colors have been developed as taught in co-pending U.S. patent application Ser. No. 11/837,529 (U.S. Patent Application Publication No. 2009/0046368, hereafter '529). As taught in '529, FIG. 1a illustrates a graph of a range to mid-range ratio equal to 0.2% for transverse magnetic mode (TM) and transverse electric mode (TE) of electromagnetic radiation plotted as a function of high refractive index versus low refractive index. This figure also shows two data points: one corresponding to an "ideal" multilayer stack made from a first material with a refractive index of 2.8 and a second material with a refractive index of 2.5; and another one corresponding to an actual fabricated multilayer stack made from vacuum deposition of $TiO_2$ with a resulting refractive index of 2.3 and $HfO_2$ with a resulting refractive index of 2.0.

Turning to FIG. 1b, a plot of reflectance as a function of incident angle illustrates the omnidirectional properties exhibited by the ideal multilayer stack when viewed from angles between 0 and 90° degrees. In contrast, FIG. 1c illustrates a reduction in the omnidirectional properties exhibited by the actual fabricated multilayer stack, in particular a decrease in the angle-independent reflectance from 0-90 degrees to 0-60 degrees.

On a plot of reflectance versus wavelength, an angle independent band of reflected electromagnetic radiation is the common reflectance of a multilayer stack when view from angles between 0 and theta (θ) degrees as illustrated by the range of wavelengths indicated by the double headed arrow in FIG. 1d. For the purposes of the present invention, this band of angle independent reflected radiation is measured at the average of the full width at half maximum (FWHM) for the two reflectance curves (0° and θ°) and can hereafter be referred to as an omnidirectional band when viewed between angles of 0 and θ degrees. It is appreciated that the extent of omnidirectional reflection, that is θ, for FIGS. 1b and 1c is 90 and 60 degrees, respectively.

It is appreciated that fabricating omnidirectional structural colors with less than desired indices of refraction can result in less than desired angle independence reflection. In addition, fabricating omnidirectional structural colors with materials that exhibit relatively high indices of refraction can be cost prohibitive. Therefore, a multilayer stack that provides omnidirectional structural color and can be made from materials that have relatively low indices of refraction would be desirable.

SUMMARY OF THE INVENTION

The present invention discloses an omnidirectional reflector that can reflect a band of electromagnetic radiation less than 200 nanometers when viewed from angles between 0 and 45 degrees. The omnidirectional reflector includes a multilayer stack having a plurality of layers of a high index of refraction material and a plurality of layers of a low index of refraction material. The plurality of high index of refraction material layers and low index of refraction material layers are alternately stacked on top of or across each other and have thicknesses such that a non-periodic layered structure is provided. Stated differently, the plurality of layers of high index of refraction material can be designated as H1, H2, H3 ... Hn and the plurality of layers of low index of refraction material can be designated as L1, L2, L3 ... Lm, with the layers having predefined thicknesses of $d_{H1}, d_{H2}, d_{H3} \ldots d_{Hn}$, and $d_{L1}, d_{L2}, d_{L3} \ldots d_{Lm}$, respectively, and the various thicknesses of the high index of refraction layers are generally not equal to each other and/or the various thicknesses of the low index of refraction layers are generally not equal to each other.

In some instances, the omnidirectional reflector includes a multilayer stack that has a reflection band of electromagnetic radiation of less than 100 nanometers when viewed from angles between 0 and 65 degrees. In other instances, the omnidirectional reflector is a multilayer stack that can reflect a band of electromagnetic radiation of less than 100 nanometers when viewed from angles between 0 and 90 degrees.

The high index of refraction material can have an index of refraction between 1.5 and 2.6, inclusive, and the low index of refraction material can have an index of refraction between 0.75 and 2.0, inclusive. The multilayer stack can have at least 3 layers, and in some instances has at least 7 layers, while in other instances has at least 13 layers. In still yet other instances, the multilayer stack has at least 19 layers.

The invention also discloses a process for omnidirectionally reflecting a narrow band of electromagnetic radiation, the process including providing a multilayer stack as taught above, providing a source of broadband electromagnetic radiation, exposing the multilayer stack to the source of broadband electromagnetic radiation, and the multilayer stack reflecting a band of less than 100 nanometers when viewed from angles between 0 and 45 degrees, or in some instances when viewed from angles between 0 and 65 degrees, or in the alternative, between 0 and 90 degrees.

BRIEF DESCRIPTION OF THE DRAWINGS

FIG. 1c is a graphical representation illustrating an actual band structure for a fabricated omnidirectional reflector;

FIG. 1d is a graphical representation illustrating an omnidirectional band for a multilayer stack;

FIG. 2 illustrates a three-layer structure made from two different materials and a corresponding single equivalent layer;

DETAILED DESCRIPTION OF THE INVENTION

Figure 1A:
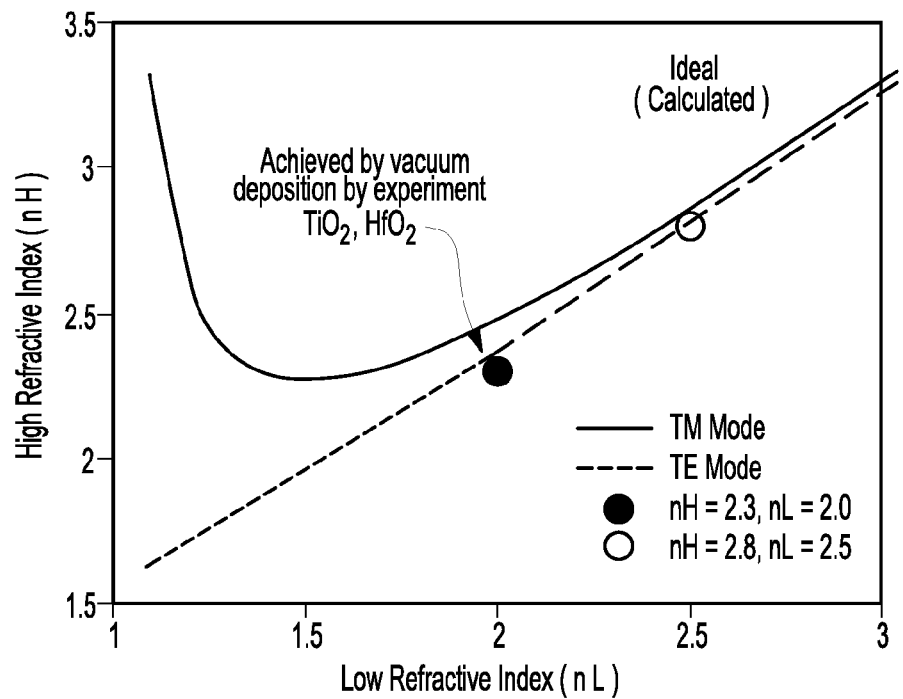
FIG. 1a is a graphical representation illustrating a refractive index zone necessary for omnidirectional structural color.
Figure 1B:
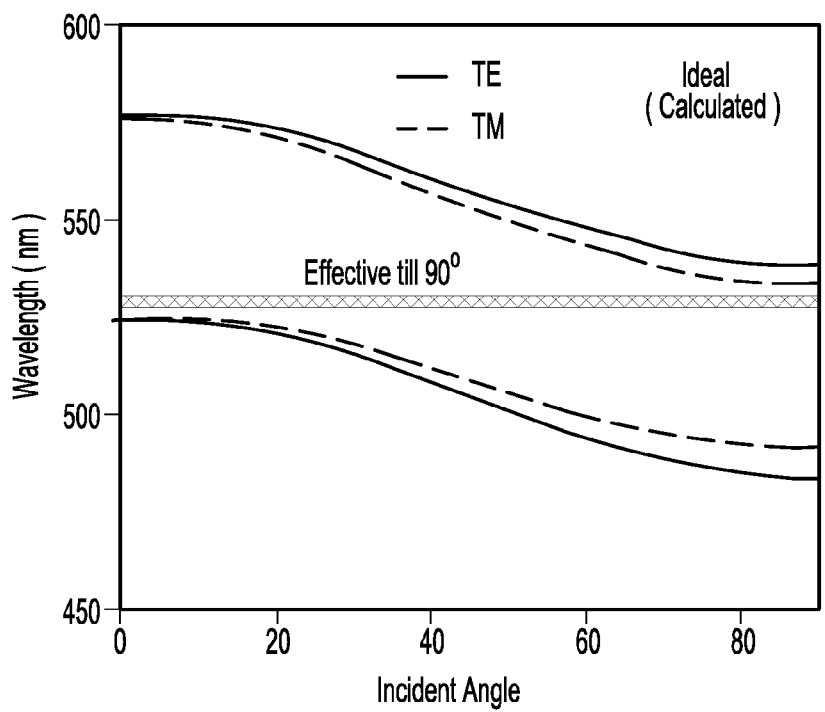
FIG. 1b is a graphical representation of a calculated or ideal band structure showing complete omnidirectionality.

The present invention discloses an omnidirectional reflector that can reflect a band of electromagnetic radiation of less than 100 nanometers when viewed from angles between 0 and 45 degrees. Stated differently, the omnidirectional reflector has an omnidirectional band of less than 100 nanometers when viewed from angles between 0 and 45 degrees. The omnidirectional reflector can include a multilayer stack with a plurality of layers of a high index of refraction material and a plurality of layers of a low index of refraction material. The plurality of layers of high index of refraction material and low index of refraction material can be alternately stacked on top of and/or across each other and have thicknesses such that a non-periodic structure is provided. In some instances, the omnidirectional band is less than 100 nanometers when viewed from angles between 0 and 65 degrees and in other instances, omnidirectional band is less than 100 nanometers when viewed from angles between 0 and 90 degrees.

The high index of refraction material can have a refractive index between 1.5 and 2.6, inclusive, and the low index of refraction material can have an index of refraction between 0.75 and 2.0, inclusive. In some instances, the multilayer stack can have at least 3 total layers in some instances, while in other instances the multilayer stack can have at least 7 total layers. In still other instances, the multilayer stack can have at least 13 total layers. In still yet other instances, the multilayer stack has at least 19 layers.

With regard to the non-periodic layered structure, the plurality of layers of high index of refraction material can be designated as H1, H2, H3 . . . Hn and the plurality of layers of low index of refraction material can be designated L1, L2, L3 . . . Lm, with the layers having predefined thicknesses designated as $d_{H1}$, $d_{H2}$, $d_{H3}$ . . . $d_{Hn}$, and $d_{L1}$, $d_{L2}$, $d_{L3}$ . . . $d_{Lm}$, respectively. In addition, the thickness $d_{H1}$ is not generally equal to at least one of the thicknesses $d_{H2}$, $d_{H3}$ or $d_{Hn}$, and the thickness $d_{L1}$ is not generally equal to at least one of the thicknesses $d_{L2}$, $d_{L3}$ or $d_{Lm}$. In some instances, the thickness $d_{H1}$ is different than $d_{H2}$ and $d_{H3}$ and/or the thickness $d_{L1}$ is different than $d_{L2}$ and $d_{L3}$. In other instances, the thickness $d_{H1}$ is different than $d_{H2}$, $d_{H3}$ . . . and $d_{Hn}$, and/or the thickness $d_{L1}$ is different than $d_{L2}$, $d_{L3}$ . . . and $d_{Lm}$.

The multilayer stack can be in the form of a flake and the flake can have an average thickness range of between 0.5 and 5 microns and/or an average diameter of between 5 and 50 microns. The flake can be mixed with a binder to provide a paint and/or an ultraviolet protective coating.

A process for omnidirectionally reflecting a narrow band of electromagnetic radiation is also disclosed. The process includes providing a multilayer stack having a plurality of layers of high index of refraction material designated as H1, H2, H3 . . . Hn, and a plurality of layers of low index of refraction material designated L1, L2, L3 . . . Lm. The layers of different materials are alternately stacked on top of and/or across each other. The plurality of layers of high index of refraction material and low index of refraction material each have a predefined thickness designated as $d_{H1}$, $d_{H2}$, $d_{H3}$ . . . $d_{Hn}$, and $d_{L1}$, $d_{L2}$, $d_{L3}$ . . . $d_{Hn}$, respectively, and the thickness $d_{H1}$ can be different than $d_{H2}$, $d_{H3}$ . . . and/or $d_{Hn}$, and the thickness $d_{L1}$ can be different than $d_{L2}$, $d_{L3}$ . . . and/or $d_{Lm}$. As such, the multilayer stack can have a non-periodic layered structure.

A source of broadband electromagnetic radiation is also provided and used to illuminate the multilayer stack. Thereafter, an omnidirectional band of less than 100 nanometers is reflected from the multilayer stack when viewed from angles between 0 and 45 degrees. In some instances, the omnidirectional band of less than 100 nanometers is angle independent when viewed from angles between 0 to 65 degrees, and in still other instances, when viewed from angles between 0 to 90 degrees. The omnidirectional band can be within the visible light region, or in the alternative, within the ultraviolet region or the infrared region. In addition, the multilayer stack can be in the form of a flake, and the flake may or may not be mixed with a binder to make a paint that is an omnidirectional structural color.

Not being bound by theory, development of an inventive multilayer stack is discussed below. A theory of equivalent layers developed during research of equivalent layer techniques, and not addressing omnidirectionality as in the instant invention, states that optical properties of a single material can be replicated by a symmetrical combination of a three-layer structure having preset high and low refractive indices of refraction (see Alexander V. Tikhonravov, Michael K. Trubetskov, Tatiana V. Amotchkina, and Alfred Thelen, "Optical coating design algorithm based on the equivalent layers theory" Appl. Optics, 45, 7, 1530, 2006). For example, a three-layer two-material structure with indices of refraction equal to $n_1$ and $n_2$, and having physical thicknesses of $d_1$ and $d_2$ that is equivalent to a single layer of material having an index of refraction of N and a thickness of D is illustrated in FIG. 2. A characteristic matrix (M) can completely describe all of the structures optical properties and Herpin's theorem states that the equivalent single-layer structure can have the same optical properties as the three-layer structure if an equivalent matrix ($M_E$) can be achieved.

A solution for $M_E$ can result in a non-unique solution set which approximates the original structure. As such, expressions for M and $M_E$ shown in Equations 1 and 2 below can be used to establish criteria for the existence of an equivalent 3-layer structure in which each matrix element of the two matrices M and $M_E$ are equated to each other.

$$M = \begin{bmatrix} \cos2\varphi_1 * \cos2\varphi_2 - p * \sin2\varphi_1 * \sin2\varphi_2 & \frac{1}{n_1}(\sin2\varphi_1 * \cos2\varphi_2 + p * \cos2\varphi_1 * \sin2\varphi_2 + q * \sin2\varphi_2) \\ in_1(\sin2\varphi_1 * \cos2\varphi_2 + p * \cos2\varphi_1 * \sin2\varphi_2 - q * \sin2\varphi_2) & \cos2\varphi_1 * \cos2\varphi_2 - p * \sin2\varphi_1 * \sin2\varphi_2 \end{bmatrix} \quad (1)$$

where:

$p = \frac{1}{2}\left(\frac{n_1}{n_2} + \frac{n_2}{n_1}\right)$, $q = \frac{1}{2}\left(\frac{n_1}{n_2} - \frac{n_2}{n_1}\right)$, $\varphi_1 = \frac{2\pi}{\lambda}(n_1 d_1)$, $\varphi_2 = \frac{2\pi}{\lambda}(n_2 d_2)$, $\lambda$ = reflected wavelength $$M_E = \begin{bmatrix} \cos\Phi & \frac{1}{N}\sin\Phi \\ iN\sin\Phi & \cos\Phi \end{bmatrix} \quad (2)$$

In so doing, the following expressions of the structural parameters of the two materials used for the 3-layer structure can be derived:

$$\cos\Phi = \cos2\varphi_1 \cos2\varphi_2 - p\sin2\varphi_1\sin2\varphi_2 \quad (3)$$

$$N = n_1 \sqrt{\frac{\sin2\varphi_1\cos2\varphi_2 + p\cos2\varphi_1\sin2\varphi_2 - q\sin2\varphi_2}{\sin2\varphi_1\cos2\varphi_2 + p\cos2\varphi_1\sin2\varphi_2 + q\sin2\varphi_2}} \quad (4)$$

and original designs of ideal omnidirectional reflectors can be replicated with equivalent structures made from different starting materials.

An illustrative example of the use of the theory of equivalent layers to design and/or provide an omnidirectional structural color is discussed below.

Example

Starting with a high index of refraction material with a refractive index of 2.89 and a low index of refraction material with a refractive index of 2.5, and using a quarter-wave thickness criterion, an expression for the thickness of the high index of refraction material $d_H$ and the thickness of the low index of refraction material $d_L$ for a given target wavelength $\lambda$ can be calculated from Equation 4 below:

$$d_H = \frac{\lambda}{4n_H}, d_L = \frac{\lambda}{4n_L} \quad (4)$$

Using a target wavelength of 575 nanometers, the layer thickness for the high index of refraction material is approximately 49.7 nanometers and the layer thickness for the low index of refraction material is approximately 57.5 nanometers. A resultant reflectance versus wavelength of such a structure can be generated using a one-dimensional (1-D) photonic calculator written for MATLAB. This calculator uses a matrix method to calculate the reflectivity, transmission, and absorptions of 1-D optically stratified medium.

Figure 3:
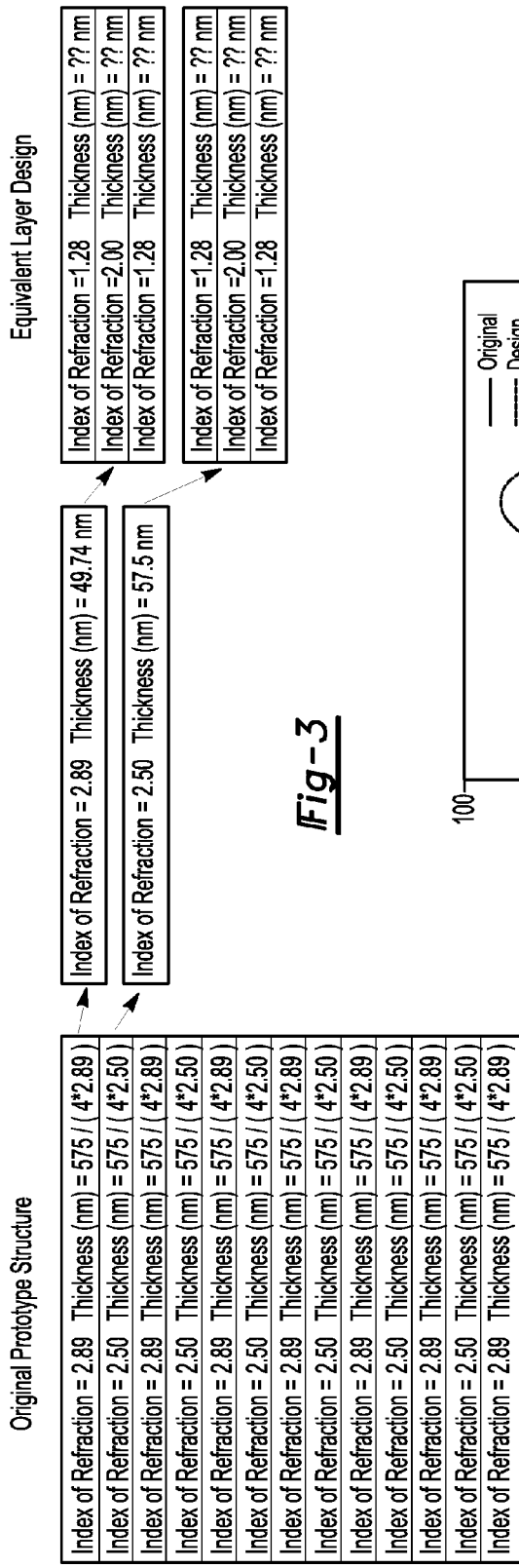
FIG. 3 illustrates an original prototype structure of an omnidirectional reflector and an equivalent layer design.

Regarding an equivalent design using different starting materials, a first material with a refractive index of 1.28 and a second material with a refractive index of 2.0 were assumed. In addition, an incident angle of 0 degrees for the illuminating electromagnetic radiation, natural light with 50% transverse electric and 50% transverse magnetic modes, a transfer medium of air and a substrate of glass were assumed. A schematic representation of the replacement of each original layer by three equivalent layers is shown in FIG. 3. As illustrated in this figure, the thicknesses of each equivalent layer used to replace each layer of the original prototype are values to be determined.

The simulation process is initiated with input of the indices of refraction for the high index of refraction material and the low index of refraction material of the original prototype. In addition, thicknesses of the two materials can be included and the 1-D photonic calculator can generate a reflectance versus wavelength plot.

Figure 4:
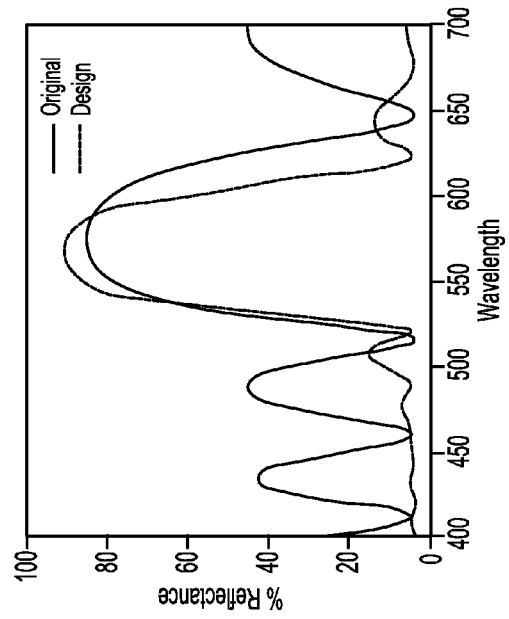
FIG. 4 is a graphical representation of reflectance versus wavelength for a 39-layer equivalent structure made from a first material and a second material replacing a 13-layer structure made from a low index of refraction material with a refractive index of 2.5 and a high index of refraction material with a refractive index of 2.89.

With regard to providing three equivalent layers to match the optical properties of each single layer, optimization consists of varying the thicknesses of the individual equivalent layers—assuming the first layer and the third layer are equal—and comparing the resultant wavelength versus reflectance curve to the original reference. An example of a simulation for replacing each layer of an original 13-layer stack with three equivalent layers is shown in FIG. 4 where an entire 13-layer original reference structure as illustrated in FIG. 3 was replicated with three equivalent layers replacing each of the original layers. Therefore, a simulation for 13×3=39 layers was chosen as a starting structure with the thicknesses of the first material ($n_1$=1.28) and the second material ($n_2$=2.0) were varied from 1 to 500 nanometers. FIG. 4 illustrates that optimization of the equivalent 39-layer structure with a first material thickness of 99 nanometers and a second material thickness of 14 nanometers provided similar results for reflectance as a function of wavelength when compared to the original 13-layer structure. The equivalent 39-layer structure also resulted in a drastic reduction in the side bands that are present for the original 13-layer structure. As such, an original two-material 13-layer structure having a high index of refraction material with a refractive index of 2.89 and a low index of refraction material with a refractive index of 2.5 is shown to be replaceable with a two-material 39-layer structure having a high index of refraction material with a refractive index of 2.0 and a low index of refraction material with a refractive index of 1.28.

In an effort to provide additional flexibility with respect to materials selection and manufacturing techniques, the concept of uncoupling the layers during optimization calculations of the layer thicknesses is introduced. As such, the previous concept of replacing the layers of the original 13-layer stack with repeating equivalent 3-layer stacks is discarded and each layer has its own multiplier that determines the final thickness thereof. For example, a 39-layer structure can have 39 separate multiplier variables, and thus 39 layers, each having a different thickness.

Figure 5:
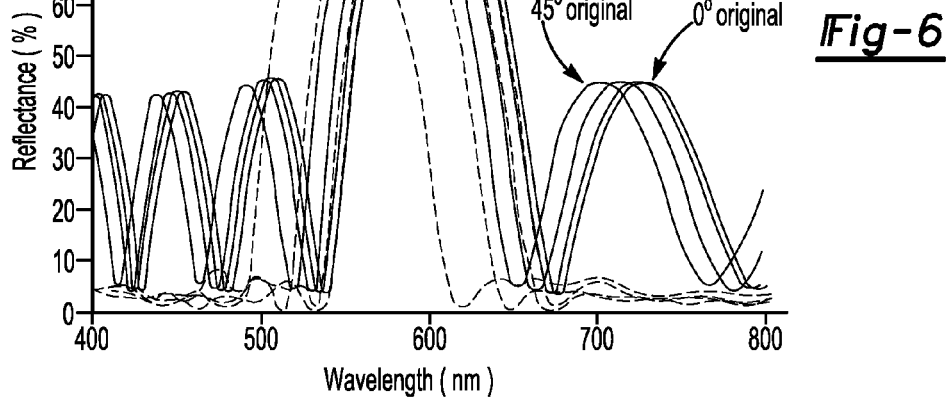
FIG. 5 illustrates an improved design concept of equivalent layer approximations.

FIG. 5 illustrates a 39-layer structure where two materials are used, with one of the materials having a high index of refraction ($N_{high}$) and one of the materials having a low index of refraction ($N_{low}$). As shown in this figure, the thickness of each of these layers is equal to a multiplier ($Mult_i$) times a reference wavelength divided by the respective index of refraction and either 4 or 8. In addition, the alternating layers of high index of refraction material are designated H1, H2, H3 . . . Hn and the alternating layers of low index of refraction material designated L1, L2, L3 . . . Lm. Furthermore, the layers each have a thickness designated as $d_{H1}$, $d_{H2}$, $d_{H3}$ . . . $d_{Hn}$, and $d_{L1}$, $d_{L2}$, $d_{L3}$ . . . $d_{Lm}$ as shown in the figure. It is appreciated that it is not necessary to perform a one-quarter or one-eighth multiplier; however, in this example such a multiplier was included simply because of experience with previous experiments and/or calculations.

Turning now to Table 1 below, a list of multiplier values determined for a 39-layer structure and solved using a LSQCURVEFIT module within an optimization Toolbox™ from MATLAB is shown.

TABLE 1

"High" - Odd layer thicknesses (nm) = $Mult_i*550/(8*N) = d_{Hi}$
"Low" - Even layer thicknesses (nm) = $Mult_j*550/(4*N) = d_{Lj}$
(Multiplier List) Multiplier values

| (M1) | (M2) | (M3) | (M4) | (M5) | (M6) | (M7) |
|---|---|---|---|---|---|---|
| 0.0435 | 1.2139 | 0.1307 | 0.8384 | 2.2490 | 1.2396 | 1.7736 |
| (M8) | (M9) | (M10) | (M11) | (M12) | (M13) | (M14) |
| 1.1475 | 2.2261 | 0.0101 | 0.0122 | 1.0889 | 2.0830 | 1.1047 |
| (M15) | (M16) | (M17) | (M18) | (M19) | (M20) | (M21) |
| 2.2077 | 1.0959 | 0.0100 | 0.0101 | 2.0387 | 1.1277 | 2.0575 |
| (M22) | (M23) | (M24) | (M25) | (M26) | (M27) | (M28) |
| 1.4407 | 0.6883 | 1.8276 | 1.0380 | 0.5775 | 0.7862 | 0.6875 |
| (M29) | (M30) | (M31) | (M32) | (M33) | (M34) | (M35) |
| 0.7576 | 0.9844 | 0.3575 | 1.0429 | 0.5748 | 0.6599 | 0.9185 |
| (M36) | (M37) | (M38) | (M39) | | | |
| 0.7343 | 0.5068 | 0.876 | 0.3094 | | | |

Figure 6:
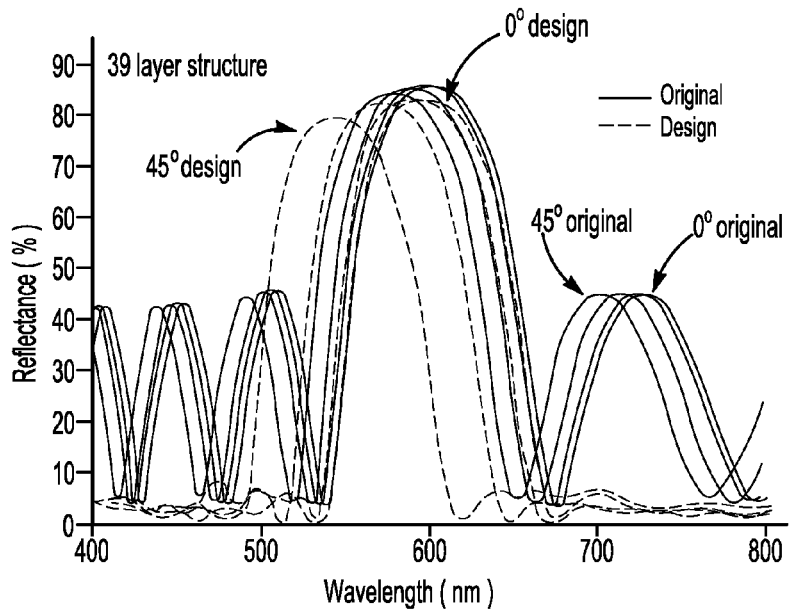
FIG. 6 is a graphical representation of reflectance versus wavelength for a 39-layer structure that is equivalent to a 13-layer structure.

Using the multipliers in Table 1 and incident angles of 0, 15, 30 and 45 degrees, calculations of the reflectance were performed in order to determine if a change in color, i.e. shift in band reflection, would occur at different angles. Desirably, the mean wavelength does not change with increasing angle and thus a truly omnidirectional color results. As shown in FIG. 6, with increasing incident angle, the calculations showed a continual "blue shift" of the mean reflected wavelength. However, this shift was less than 75 nanometers and thus a non-periodic layered structure exhibiting omnidirectional structural color is provided. In addition, it is appreciated that this shift of the mean wavelength is a shift of the center wavelength of the reflection band shown in FIG. 6.

Figure 7:
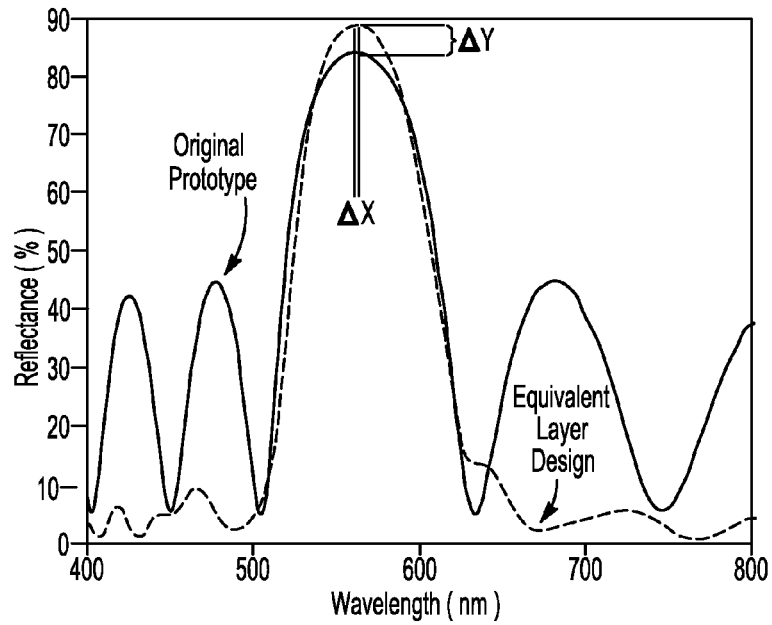
FIG. 7 is a graphical representation of the difference in maximum wavelength ($\Delta X$) and maximum reflectance ($\Delta Y$) between the 39-layer structure and the 13-layer structure.

In order to develop a broad evaluation of possible materials that can be used for making an omnidirectional reflector, calculations were performed for materials having refractive indices ranging from 1.4 to 2.3 for the "high" index materials and 1.2 to 2.1 for the "low" index materials. Optimization parameters were defined as the absolute value of the difference in maximum wavelengths ($\Delta X$) between an original prototype and an equivalent layer design, and the absolute value of the difference in maximum reflectance ($\Delta Y$) between the original prototype and the equivalent layer design. Examples of $\Delta X$ and $\Delta Y$ are shown in FIG. 7 and it is appreciated that the X and Y coordinates for the maximum reflectance for the original prototype structure and the equivalent layer design were chosen to calculate $\Delta X$ and $\Delta Y$. In addition, in order to visually illustrate $\Delta X$ and $\Delta Y$ as a function of refractive index pairs, plots such as FIGS. 8-11 were developed and discussed below.

Figure 8:
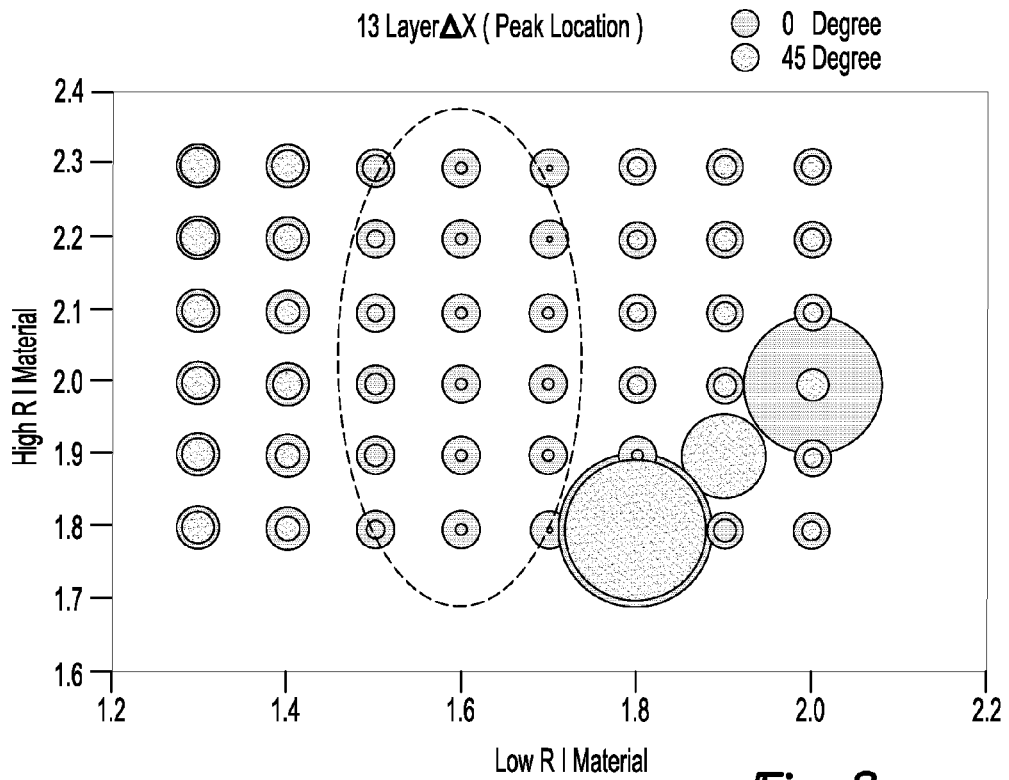
FIG. 8 is a plot of $\Delta X$ between a 13-layer periodic structure and an equivalent 13-layer non-periodic structure for a 0 and 45 degree incidence angles as a function of refraction index values for a low refraction index material and a high refractive index material.
Figure 9:
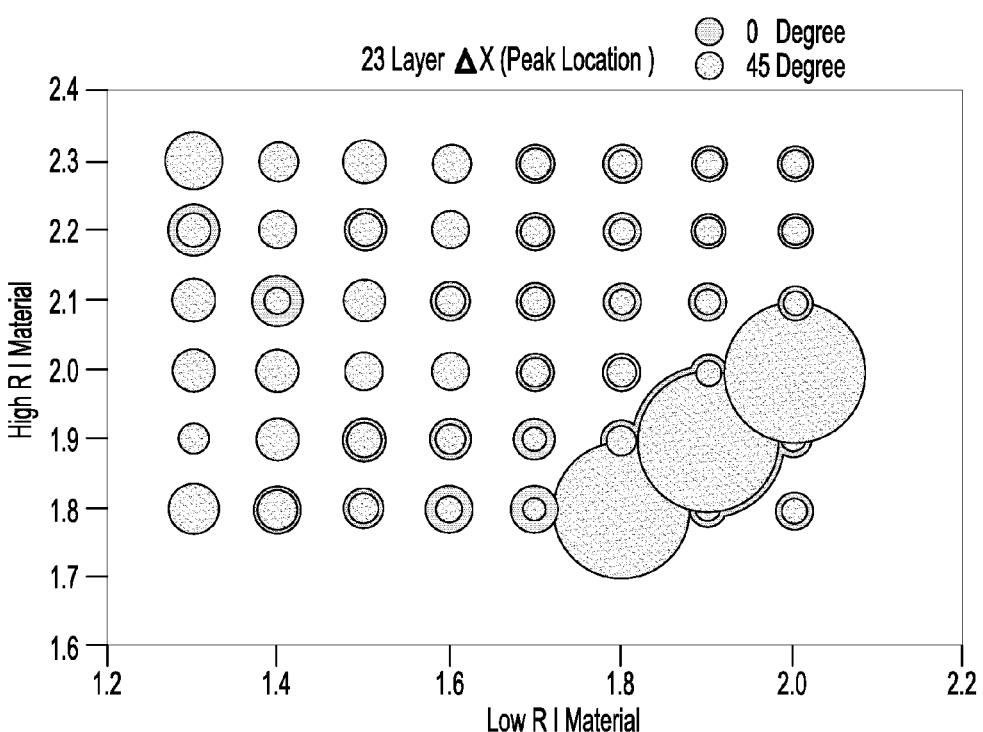
FIG. 9 is a plot of $\Delta X$ between a 23-layer periodic structure and an equivalent 23-layer non-periodic structure for a 0 and 45 degree incidence angles as a function of refraction index values for a low refraction index material and a high refractive index material.

FIG. 8 illustrates the difference in $\Delta X$ between an original 13-layer prototype and an equivalent 13-layer non-periodic design at 0 and 45 degree angles of incidence with the diameters of the shaded circles shown on the graph proportional to $\Delta X$ between the original prototype and the equivalent layer design. The larger the shaded circle, the greater the value of $\Delta X$, and thus the greater the shift in the maximum wavelength between the original 13-layer prototype and the equivalent non-periodic layer design made from two materials having that lower refractive indices. In this manner, refractive index pairs can be easily identified in which there is a small difference in the maximum wavelengths between the original 13-layer prototype and the equivalent non-periodic layer design. Similarly, FIG. 9 illustrates $\Delta X$ between an original 23-layer prototype and an equivalent 23-layer non-periodic design at 0 and 45 degree angles of incidence.

Figure 10:
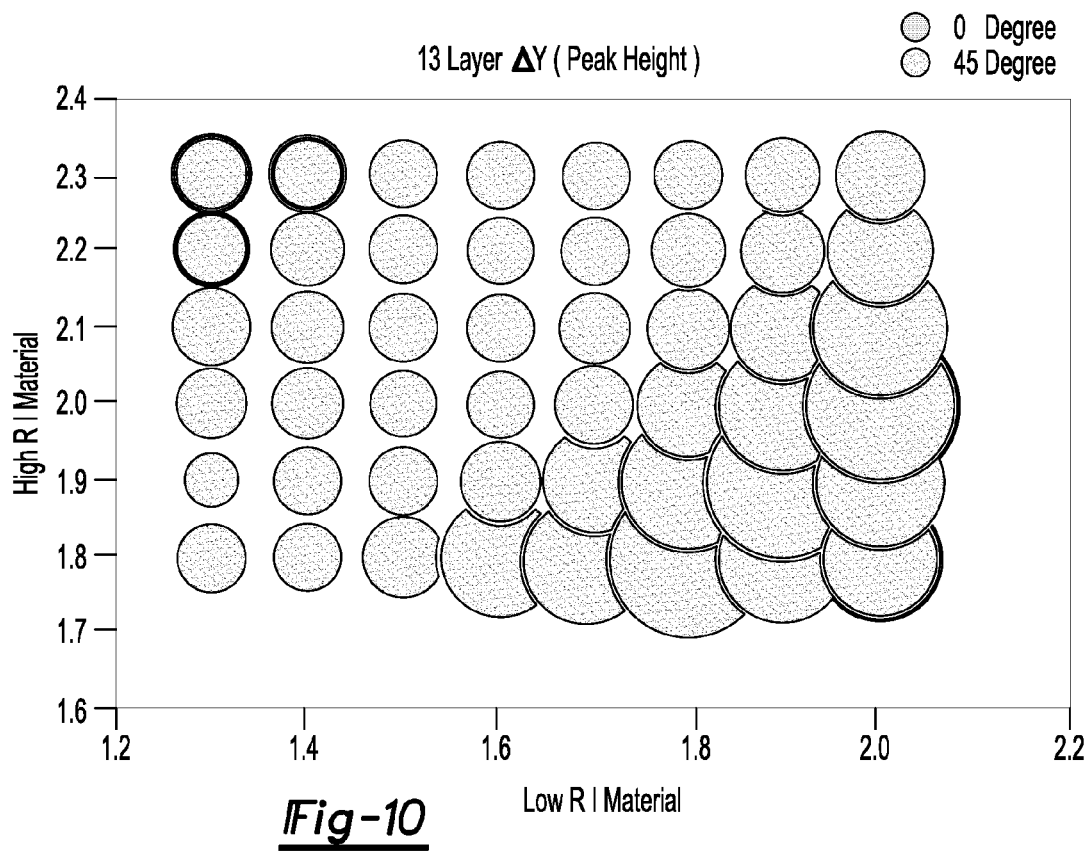
FIG. 10 is a plot of $\Delta Y$ between a 13-layer periodic structure and an equivalent 13-layer non-periodic structure for a 0 and 45 degree incidence angles as a function of refraction index values for a low refraction index material and a high refractive index material.
Figure 11:
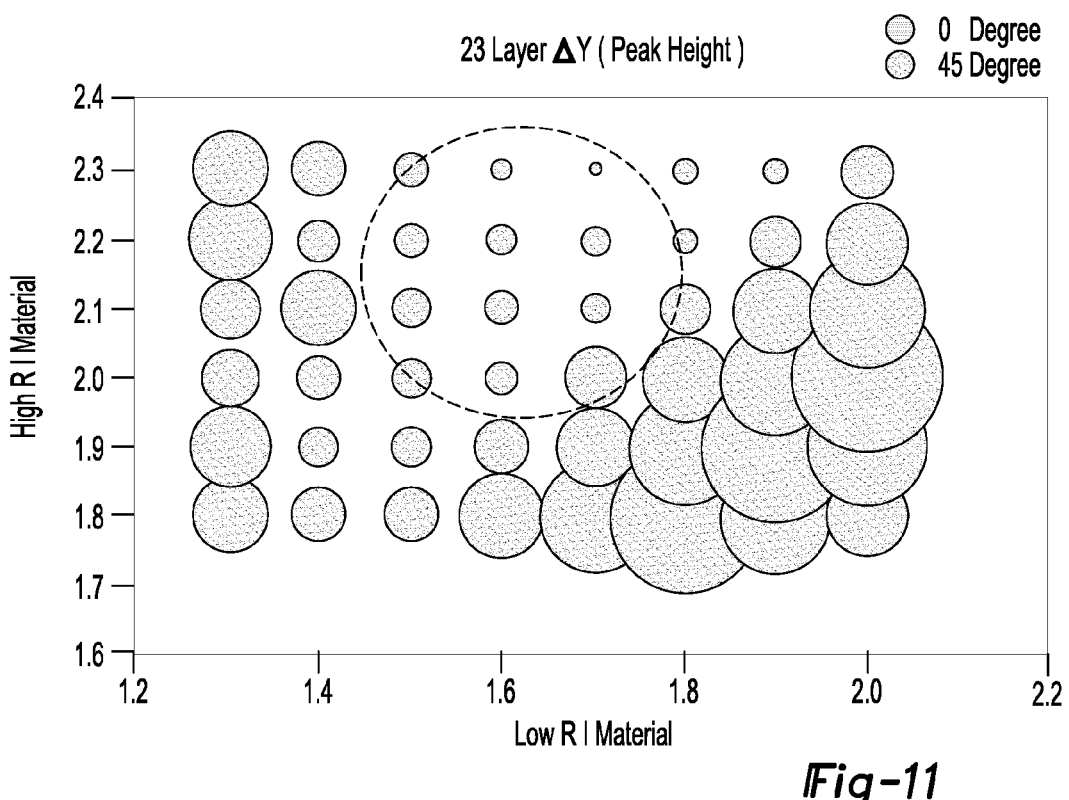
FIG. 11 is a plot of $\Delta Y$ between a 23-layer periodic structure and an equivalent 23-layer non-periodic structure for a 0 and 45 degree incidence angles as a function of refraction index values for a low refraction index material and a high refractive index material.

Turning now to FIGS. 10 and 11, $\Delta Y$ between the 13-layer and 23-layer original prototypes and equivalent 13-layer and 23-layer non-periodic layer designs, respectively, are shown as a function of refractive index pairs for 0 and 45 degree incidence angles. As with FIGS. 8 and 9, review of FIGS. 10 and 11 allow easy identification of refractive index pairs in which there is a small difference in $\Delta X$ and $\Delta Y$ between original multi-layer prototypes and equivalent non-periodic multi-layer designs. For example, review of FIGS. 8-11 illustrates that a first material with a refractive index in the range of 1.5 to 1.7 and a second material with a refractive index in the range of 2.0 to 2.3 could be suitable for making a non-periodic multilayer stack that exhibits omnidirectional structural color with a color/reflectance band centered about 575 nanometers.

It is appreciated that altering or selecting a different target reflection band (e.g. a different color) can change the actual trends shown in FIGS. 8-11. However, trends will still exist and thus identification of suitable refractive index pairs is provided.

Figure 12:
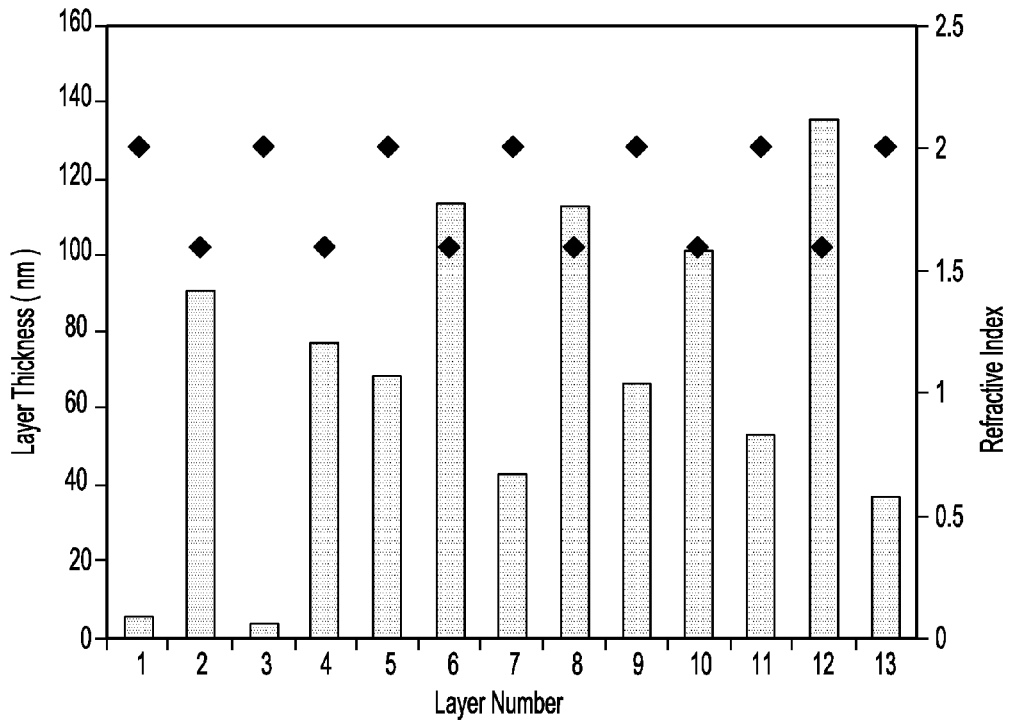
FIG. 12 is a plot of layer thickness and refractive indices for layers of a 13-layer non-periodic structure according to an embodiment of the present invention.
Figure 13:
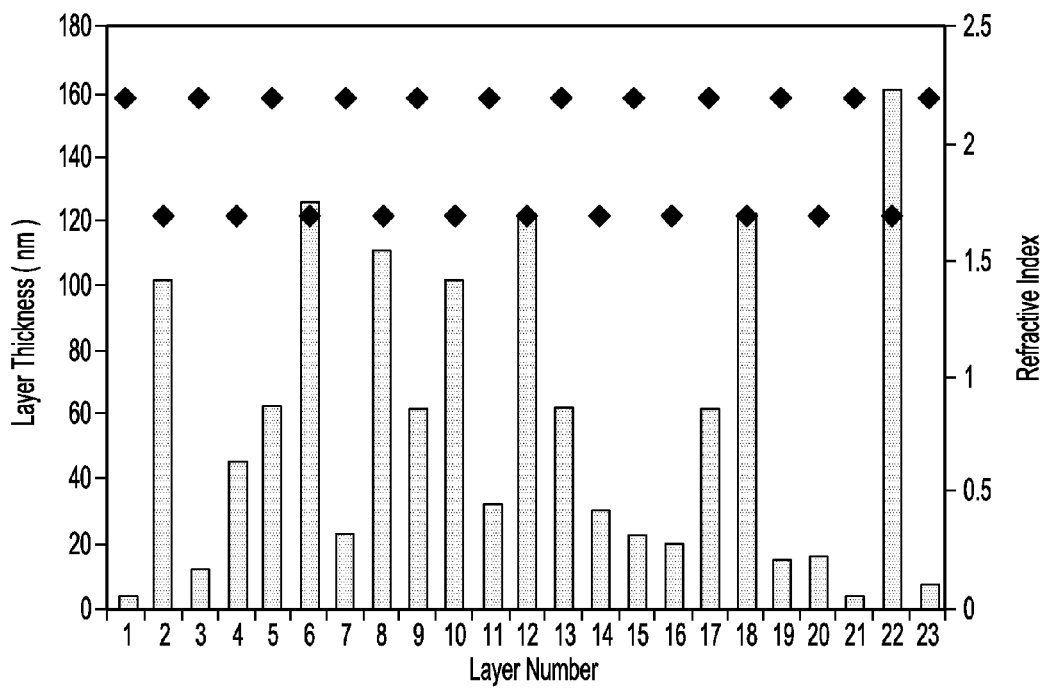
FIG. 13 is a plot of layer thickness and refractive indices for layers of a 23-layer non-periodic structure according to an embodiment of the present invention.

Illustrating actual design thicknesses for a non-periodic omnidirectional structural color, FIG. 12 shows a schematic thickness plot for a 13-layer non-periodic multilayer made from a first material having a refractive index of 2.0 and a second material having a refractive index of 1.6 are shown in FIG. 12. The thicknesses of the various layers are shown by the elongated rectangles which correspond to the left y-axis and the refractive index of each layer is shown by the solid diagonals which correspond to the right y-axis. Similarly, the layer thicknesses for a 23-layer non-periodic omnidirectional structural color made using a first material with a refractive index of 2.2 and a second material with a refractive index of 1.7 are shown in FIG. 13.

In this manner, an omnidirectional structural color can be designed and manufactured for most any given desired wavelength using a greater range of materials than previously available. Such materials include metals, semiconductors, ceramics, polymers, and combinations thereof. It is appreciated that the opportunity to use a greater range of materials further affords for a greater range of manufacturing techniques to make desired multilayer stacks/structures.

The invention is not restricted to the examples described above. The examples are not intended as limitations on the scope of the invention; and methods, apparatus, compositions, materials, and the like described herein are exemplary and not intended as limitations on the scope of the invention.

Changes and other uses will occur to those skilled in the art. As such, the scope of the invention is defined by the scope of the claims.

The invention claimed is:

1. An omnidirectional reflector comprising:
a multilayer stack having a plurality of layers of high index of refraction material H1, H2, H3 . . . Hn and a plurality of layers of low index of refraction material L1, L2, L3 . . . Lm, said plurality of layers of high index of refraction material and plurality of layers of low index of refraction material alternately stacked on top of each other;
said plurality of layers of high index of refraction material and plurality of layers of low index of refraction material each having a predefined thickness of $d_{H1}$, $d_{H2}$, $d_{H3}$ . . . $d_{Hn}$ and $d_{L1}$, $d_{L2}$, $d_{L3}$ . . . $d_{Lm}$, respectively, and said $d_{H1}$ thickness not generally equal to said $d_{H2}$, $d_{H3}$ . . . or $d_{Hn}$ thickness and said $d_{L1}$ thickness not generally equal to said $d_{L2}$, $d_{L3}$ . . . or $d_{Lm}$ thickness such that said multilayer stack has a non-periodic layered structure; and
said multilayer stack defining a reflector having a single reflection band with a center wavelength in the visible spectrum, said single reflection band being a reflectance greater than 60% of said center wavelength of a narrow band of electromagnetic radiation, said single reflection band also having a full width at half maximum (FWHM) of less than 200 nanometers and a shift of said center wavelength of less than 75 nanometers when said reflector is viewed from angles between 0 degrees and 45 degrees.

2. The omnidirectional reflector of claim 1, wherein said reflection band has a FWHM of less than 100 nanometers when viewed from angles between 0 degrees and 65 degrees.

3. The omnidirectional reflector of claim 1, wherein said reflection band has a FWHM of less than 100 nanometers when viewed from angles between 0 degrees and 90 degrees.

4. The omnidirectional reflector of claim 1, wherein said high index of refraction material has an index of refraction between 1.5 and 2.5, inclusive, and said low index of refraction material has an index of refraction between 0.75 and 1.75, inclusive.

5. The omnidirectional reflector of claim 1, wherein said multilayer stack has at least 3 total layers.

6. The omnidirectional reflector of claim 1, wherein said multilayer stack has at least 7 total layers.

7. The omnidirectional reflector of claim 1, wherein said multilayer stack has at least 13 total layers.

8. The omnidirectional reflector of claim 1, wherein said $d_{H1}$ thickness is not generally equal to said $d_{H2}$ and $d_{H3}$ thicknesses and said $d_{L1}$ thickness is not generally equal to said $d_{L2}$ and $d_{L3}$ thicknesses.

9. The omnidirectional reflector of claim 1, wherein said $d_{H1}$ thickness is not generally equal to said $d_{H2}$, $d_{H3}$ . . . and $d_{Hn}$ thicknesses.

10. The omnidirectional reflector of claim 1, wherein said $d_{L1}$ thickness is not generally equal to said $d_{L2}$, $d_{L3}$ . . . and $d_{Lm}$ thicknesses.

11. The omnidirectional reflector of claim 1, wherein said $d_{H1}$ thickness is not generally equal to said $d_{H2}$, $d_{H3}$ . . . and $d_{Hn}$ thicknesses, and said $d_{L1}$ thickness is not generally equal to said $d_{L2}$, $d_{L3}$ . . . and $d_{Lm}$ thicknesses.

12. The omnidirectional reflector of claim 1, wherein said multilayer stack is in the form of a flake.

13. The omnidirectional reflector of claim 12, wherein said flake has an average thickness range of between 0.5 and 5 microns.

14. The omnidirectional reflector of claim 12, wherein said flake has an average diameter range of between 5 and 50 microns.

15. The omnidirectional reflector of claim 12, wherein said flake is mixed with a binder to make a paint.

16. A process for omnidirectionally reflecting a narrow band of electromagnetic radiation, the process comprising:
providing a multilayer stack having a plurality of layers of high index of refraction material H1, H2, H3 . . . Hn and a plurality of layers of low index of refraction material L1, L2, L3 . . . Lm alternately stacked on top of each other;
the plurality of layers of high index of refraction material and the plurality of layers of low index of refraction material each having a predefined thickness of $d_{H1}$, $d_{H2}$, $d_{H3}$ . . . $d_{Hn}$, and $d_{L1}$, $d_{L2}$, $d_{L3}$ . . . $d_{Lm}$, respectively, and the $d_{H1}$ thickness is not generally equal to the $d_{H2}$, $d_{H3}$ . . . or $d_{Hn}$ thickness and the $d_{L1}$ thickness is not generally equal to the $d_{L2}$, $d_{L3}$ . . . or $d_{Lm}$ thickness such that the multilayer stack has a non-periodic layered structure;
providing a source of broadband electromagnetic radiation;
exposing the multilayer stack to the source of broadband electromagnetic radiation; and
the multilayer stack reflecting a single reflection band with a center wavelength in the visible spectrum, the reflection band having reflectance greater than 60% of the center wavelength of a narrow band of electromagnetic radiation, the reflection band also having a full width at half maximum (FWHM) of less than 200 nanometers and a shift of the center wavelength of less than 75 nanometers when the reflector is viewed from angles between 0 degrees and 45 degrees.

17. The process of claim 16, wherein the $d_{H1}$ thickness is not generally equal to the $d_{H2}$ and $d_{H3}$ thicknesses and the $d_{L1}$ is not generally equal to the $d_{L2}$ and $d_{L3}$ thicknesses.

18. The process of claim 16, wherein the multilayer stack is in the form of a flake.

* * * * *

UNITED STATES PATENT AND TRADEMARK OFFICE
CERTIFICATE OF CORRECTION

PATENT NO. : 8,736,959 B2
APPLICATION NO. : 12/793772
DATED : May 27, 2014
INVENTOR(S) : Benjamin Alan Grayson et al.

Page 1 of 1

It is certified that error appears in the above-identified patent and that said Letters Patent is hereby corrected as shown below:

In the Claims:

At column 9, claim number 9, line number 53, Delete "$d^{Hn}$", Insert --$d_{Hn}$--.

Signed and Sealed this
Twenty-eighth Day of April, 2015

Michelle K. Lee
*Director of the United States Patent and Trademark Office*